United States Patent [19]

Forward

[11] Patent Number: 5,183,225
[45] Date of Patent: Feb. 2, 1993

[54] STATITE: SPACECRAFT THAT UTILIZES SIGHT PRESSURE AND METHOD OF USE

[76] Inventor: Robert L. Forward, P.O. Box 2783, Malibu, Calif. 90265

[21] Appl. No.: 294,788

[22] Filed: Jan. 9, 1989

[51] Int. Cl.$^5$ .................................................. B64G 1/36
[52] U.S. Cl. ................................ 244/168; 244/158 R; 244/173
[58] Field of Search ............ 244/168, 173, 172, 158 R

[56] References Cited

U.S. PATENT DOCUMENTS

| | | | |
|---|---|---|---|
| 3,588,000 | 6/1971 | Buckingham | 244/168 |
| 4,262,867 | 4/1981 | Piening | 244/168 |
| 4,325,124 | 4/1982 | Renner | 244/173 |
| 4,728,061 | 3/1988 | Johnson et al. | 244/173 |
| 4,759,517 | 7/1988 | Clark | 244/168 |

OTHER PUBLICATIONS

R. K. Chetty et al., "Enhanced Power Generation by Optical Solar Reflectors on Geostationary Spinners", ©1979, see Abstract.

D. C. Briggs et al., "Electrical Power Subsystem for INSAT-1", Ford Aerospace, see p. 1, para. 4.

Primary Examiner—Joseph F. Peters, Jr.
Assistant Examiner—Christopher P. Ellis

[57] ABSTRACT

An artificial space object capable of operating usefully adjacent to, but not in orbit about, a celestial body such as the Earth, comprising: payload means for providing useful services from a position in space adjacent to the Earth, light pressure propulsion means for intercepting light pressure and directing the resulting force to oppose the gravitational force between the Earth and the space object; and attachment means for attaching the propulsion system to the payload, whereby the force generated by the propulsion system may be transmitted to payload. The invention is designated a "Statite", i.e. a useful space payload maintained by light pressure in a position adjacent to the surface of a celestial body, but not in orbit around it. The propulsion system may be a solar sail or it may be a solar photon thruster. The useful payload may be the space segment of a communications, broadcasting, remote sensing, or any other useful space system. The invention also teaches several methods of operating a Statite including polar and near polar positioning; solar orbital positioning; and halo orbit positioning.

4 Claims, 5 Drawing Sheets

STATITE: SPACECRAFT THAT UTILIZES SIGHT PRESSURE AND METHOD OF USE

TECHNICAL FIELD

The present invention relates to an apparatus and its method of use in outerspace. More particularly the present invention relates to an artificial space object whose position in space relative to a celestial object is maintained as a balance between gravity and a continuous force derived from light pressure. In addition, the present invention pertains to an artificial space object maintained usefully adjacent to, but not in orbit around, a celestial object. Most particularly, the present invention is a space object that comprises a useful payload connected to a solar sail, whereby the solar sail produces a force that allows the useful payload to maintain its position in space adjacent to the Earth without being in orbit around the Earth.

BACKGROUND ART

The prior art that relates to this invention, lies in two general areas. The first is artificial satellites. The second, solar sails. These will each be discussed.

ARTIFICIAL EARTH SATELLITES

The scientific possibility of launching a device so it remained in orbit around the Earth was first mentioned by Newton in Definition V of Principia. He imagined a mountain so high that air no longer interfered with the motion of a projectile. Then a projectile, shot horizontally from the top of the mountain would fall to Earth at some distance. If the speed of the projectile was increased the trajectory would flatten out and it would fall to Earth further away. Eventually, if the projectile is given a velocity such that the curvature of its trajectory coincides with that of the Earth's surface, it will go entirely around the Earth and continue to circle it. Newton desired to draw the analogy that the gravitational laws governing the motion of celestial bodies would also apply to a body ejected from Earth and circling it in the vacuum of outer space at a velocity high enough that centrifugal and gravitational forces balanced. Two and a quarter centuries later, Newton's concept was realized by the launch of Sputnik 1 on Oct. 4, 1957. Since the launch of Sputnik 1, thousands of artificial space objects have been placed in orbit around the Earth. Today it is possible to purchase commercial launch services to place payloads in orbit from vendors in several countries, including the United States, Soviet Union, China and France.

To properly appreciate the present invention, it is important to realize that all of the thousands of space objects placed in orbit around the Earth fall in a closed trajectory around the Earth under the influence of gravity. Although the satellites may carry a small reserve of fuel to alter their orbital trajectory, all space objects currently adjacent to the Earth spend the vast majority of their existence freely falling such that the centrifugal force generated by their orbital velocity exactly balances the gravitational force exerted on them by the Earth. Indeed, the definition of the word "satellite" is "the lesser component of a two body system revolving, together with the primary, around a common center of mass" (*The Physical Principals of Astronautics*, A. I. Berman, John Wiley and Sons, Inc., 1961 at page 331). While the word "orbit" means "the path of a body acted upon by the force of gravity." (*Encyclopedia of Space Technology*, Ken Gatland, Harmony Books, 1982 at page 287).

Satellites are placed into various orbits for different tasks. The purpose of these orbits is to allow the satellite to remain adjacent to the Earth so it will be useful for some purpose. For example, it is desirable that communication satellites remain stationary over a single point of the Earth's surface, this allows the ground stations used to send and receive signals to the communication satellites to be simple fixed parabolic antennas that point in a single direction. The laws of physics provide only a single orbital arc, called the Geostationary Orbital Arc, over the Earth's equator, at a distance of about 22,500 miles, where the orbital period of a satellite is the same as the Earth's rotational period. Thus, a satellite placed in this geosynchronous orbital arc over the Equator will remain fixed over a single spot on the Earth's surface, as if it was at the top of a tall tower. The fact that there is only one such orbital arc, and it is uniquely useful for communication satellites, creates a limited resource, i.e. orbital positions along the arc. For various technical reasons, it is the current practice to space communications satellite no closer together than every two degrees along this arc. There are only 180 of these orbital positions available for the entire Earth. This limited resource is allocated by an international organization, The International Telecommunications Union ("ITU"). Allocation of geosynchronous orbital arc positions or "slots", has been hotly debated by the World Administrative Radio Conference, which is an organ of the ITU.

The geosynchronous orbital arc is most useful for communications between the points in the Earth that lie near the Equator where the ground station antennas may point more or less toward the zenith. Since the slope of the Earth approximates a sphere, and its surface is provided by geologic processes with irregularities such as mountains, etc., geosynchronous satellites are relatively useless in high latitudes. It is possible to make use of other types of orbits for high latitude communications. For example, the molyna orbit is used by Soviet satellites. This orbit has an apogee at roughly geosynchronous altitude over the North Pole, while the perigee near the South Pole is only a few hundred miles. This orbit has an orbital period of twelve hours and requires three satellites to maintain continuous satellite presence within fifteen degrees (15%) of the zenith, over the northern latitudes. Further, since the satellites do not remain motionless in the sky, the ground stations must be equipped with complex and expensive tracking antennas which add greatly to their cost and complexity.

Despite the billions of dollars and thousands of man-years spent over the past decades to discover how to provide satellite communication services at high latitudes, no one geostationary prior to the present invention, had devised a way to provide a geostationary space communication system other than in geosynchronous orbit over the Equator.

The trend in communication satellite technology is to build larger geosynchronous satellites that carry more powerful microwave transponders. Such transponders, by main force, are marginally more capable of communicating with high latitude ground stations.

To the best of the present inventor's knowledge, no prior art teaches the use of any artificial space object other than a satellite in orbit around the Earth.

SOLAR SAILS

In the early nineteen twenties the Russian theoretician F. A. Tsander conducted research on the use of mirror systems to provide an apparatus for facilitating movement in outerspace.

English language references to spacecraft propelled by solar radiation pressure data back to Carl Wiley's "Clipper Ships of Space" in the May, 1951 issue of Astounding Science Fiction. This article describes the sail made in space of thin metal film and connected to the payload by means of shrouds. The earliest English technical proposal, by R. L. Garwin, in Jet Propulsion, Volume 28, pp. 188-90, proposed a deployable plastic film sail, also a parachute type. In April of 1959, Cotter in the Sandia Research Colloquium, S.C.R.-78, proposed a variety of sail designs.

In his Master's Thesis of January, 1960, P. Villers describes a variety of sail concepts.

A typical solar sail is shown in U.S. Pat. No. 4,614,319, issued to K. E. Drexler in 1986.

The present inventor has proposed placing communication satellites in light levitated geostationary cylindrical orbits using perforated light sails (Journal of the Astronautical Sciences, Volume 32, No. 2, April-June 1984, pp. 221-226).

All of the prior art in space systems teaches only the use of satellites in orbit around the Earth. Prior art solar sails teach the use of these sails as a propulsion means to accelerate payloads into desired trajectories. The present inventor's own work teaches the use of the solar sail to partially counteract the Earth's gravity so to alter the orbital characteristics of a satellite.

Nothing in the prior art known to the present inventor teaches the use of a light pressure propulsion system connected to a useful payload and controlled so the resulting artificial space object is maintained in a desired position usefully adjacent to a celestial object by balancing light pressure force against gravitational force without the space object being in orbit around the Earth.

It is an object of the present invention to provide an apparatus that is an artificial space object maintained adjacent to the Earth by light pressure force, but not in orbit around the Earth.

It is another object of the present invention to provide a space object supplying useful services that is not in orbit around the Earth.

It is yet a further object of the present invention to provide an artificial space object that does not move to a significant degree with respect to the center of the Earth, i.e. it is not in orbit around a common center of mass with the Earth.

Still another object of the present invention is to provide an artificial space object adjacent the Earth that does not use centrifugal force from orbital motion about the Earth to counteract any significant portion of the Earth's gravitational attraction.

SUMMARY OF THE INVENTION

A space object, comprising a useful payload such a communication, broadcast, weather, navigation, remote sensing or other space segment system, is attached to a solar light pressure propulsion system operating to counteract the gravitational force acting on this space object. This new class of artificial space objects is called a "Statite". The Statite is launched by a conventional rocket launch vehicle means to an altitude where the light pressure propulsion system can function. The light pressure propulsion system is then used to place and maintain the Statite usefully adjacent to the Earth. The gravitational pull of the Earth on the Statite is counter balanced by the light pressure force acting on the propulsion system.

The present inventor believes that his invention is distinctly different from all prior art concepts for providing useful services from artificial space objects, because the Statite is not in orbit around, and therefore is not a satellite of, the Earth. The apparatus taught by the the present invention does not move significantly with respect to the center of the Earth and does not use centrifugal force from orbital motion about the Earth to counteract any significant portion of the Earth's gravitational attraction.

The Statite may positioned at any point above the Earth's surface where sunlight may be used to counter the Earth's gravitational field. The greatest utility of the present invention lies in placing the Statite in a position that allows it to appear to be a fixed object when viewed from the ground at high latitudes. Such a Statite may then function as a geostationary communication Statite, in exactly the same way as a geosynchronous communication satellite performs this function over the Equator. Of course, the Earth is used herein only as an example of a celestial body and is not intended to limit the present invention. A Statite may be used adjacent to the moon, mars, the sun, an asteroid or any other celestial body.

It is possible to position a Statite directly over the North or South Pole of the spinning Earth. To an observer on the Earth, a Statite so positioned will appear fixed above the Pole, like the North Star, while the stars rotate around it. In this embodiment of the present invention, communication ground stations can use fixed mounted antennas and simple fixed gain, fixed frequency electronics similar to those used with satellites operating in equatorial geostationary orbit.

In another version of the present invention, the Statite may be offset from the Polar axis. It stays fixed above one point on the dark side of the Earth, while the Earth spins beneath it. In this embodiment the Statite does not have to be positioned directly opposite from the Sun. The Statite can be placed anywhere over a large area on the dark side of the Earth. This flexibility of position stands in strong contrast to the single linear arc of the equatorial geostationary orbit taught by the prior art.

From the standpoint of an observer on the rotating Earth, the embodiment of the Statite which is offset from the Polar axis appears to rotate around the Pole once every twenty-four (24) hours (a solar day). Thus, ground stations for communications with such communication Statites must have their antennas on a Polar mount and require a simple twenty-four (24) hour clock drive. Since the distance between the ground station and the Statite does not change significantly in magnitude, the doppler shifts for such a system are very low. Thus, the electronics needed for these versions of the invention are nearly as simple as those used with geostationary statites.

Although a broadcast Statite is deemed by the present inventor to be the highest and best use of his invention, Statites may also be used for any other service currently performed by satellites.

DETAILED DESCRIPTION OF THE INVENTION

The Statite is an artificial space object comprising a useful payload attached to a solar light pressure propulsion system. The Statite is launched by a standard rocket launch vehicle either directly to the desired operating point in space where the light pressure propulsion system would be deployed, or to a lower position in space that is high enough that the light pressue propulsion system can be deployed and the Statite flown into position using light pressure. Since the final velocity of the Statite with respect to the center of the Earth during the operation of the Statite is essentially zero, the direct placement of the Statite into space involves a simple "popup" type launch with considerable savings in fuel over a launch to orbital velocity at the same altitude. The Statite uses the pressure of sunlight, not centrifugal acceleration provided by velocity, to counter the Earth's gravitational attraction.

Once the Statite is near its desired position and the light pressure propulsion system is deployed, a sensing system could acquire three points, for example, the Sun, the Star Canopus, and the Earth. This data would allow an onboard computer to determine the Statite's position with respect to the center of the Earth. The solar sail could then be trimmed to modulate the thrust level of the light pressure propulsion system and its direction of thrust to bring the Statite to the desired position in space and maintain it there.

The light pressure propulsion system could be combined with a solar power generation system that would enhance onboard electric power. Waste heat from the solar electric conversion system can provide a component of propulsive thrust. The availability of large amounts of onboard electrical power would be advantageous for Statites providing direct broadcast services.

Figure 1:
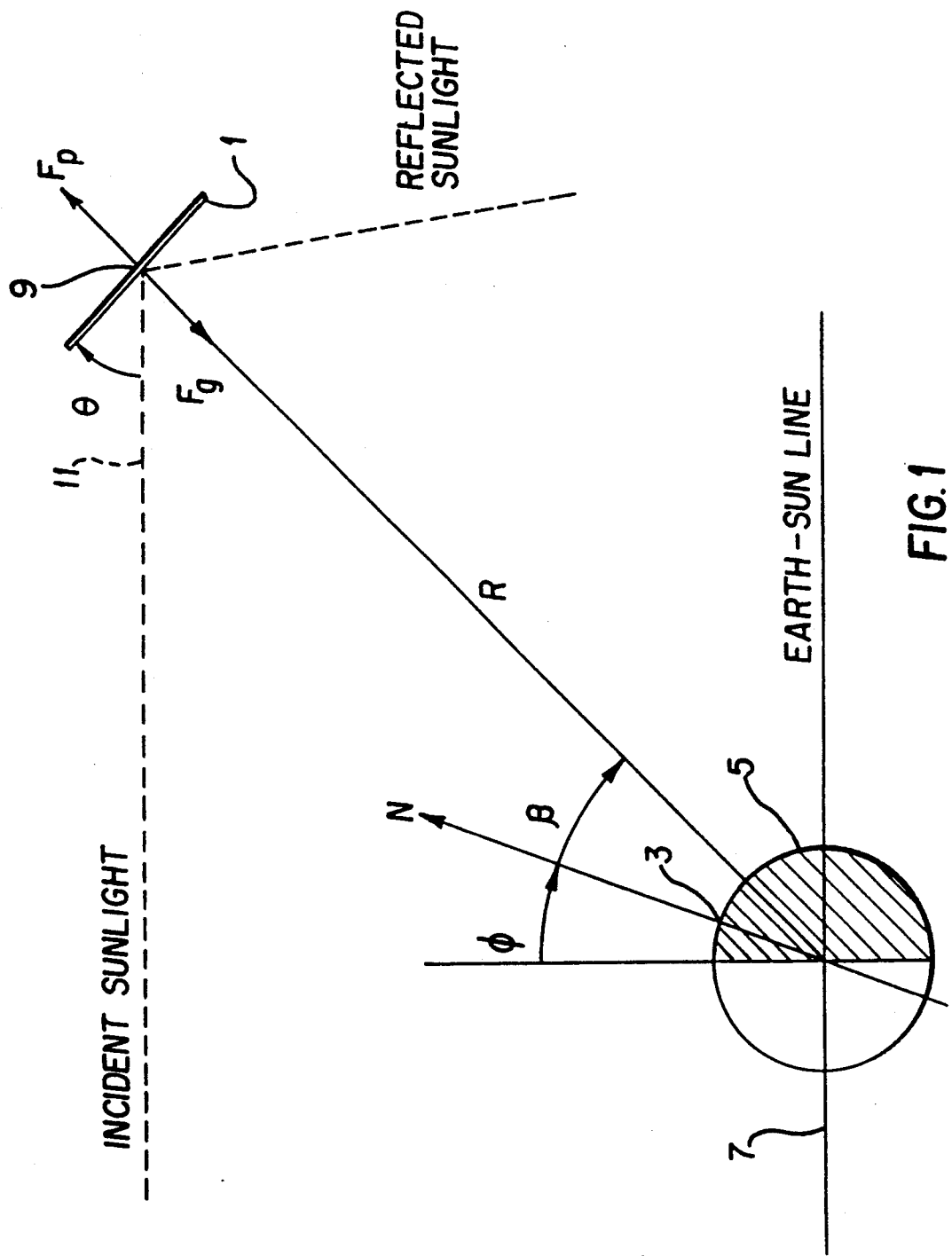
FIG. 1 is a force diagram for a simple Statite system.

A basic force diagram for the simplest version of the Statite system is shown in FIG. 1. For simplicity, the light pressure propulsion system is discussed as a flat solar sail 1. In practice, however, it is likely that an improved light pressure propulsion system, such as the solar photon thruster, will be used.

In FIG. 1, the plane of the diagram is not normal to the plane of the ecliptic, but has been rotated about the Earth-sun line until the Polar axis is in the plane of the drawing. In FIG. 1, the North Pole 3, of the Earth 5, is tilted in an angle theta with respect to the terminator (the shadow line around the Earth), which is normal to the sunlight 7 falling on the Earth. The angle theta is due to the tilt of the Polar axis of the Earth with respect to the ecliptic and varies plus or minus 23.5 degrees during the year.

Statite 9 is placed at a distance "R" from the Earth and at an angle beta with respect to the Earth's Polar axis. For simplicity, FIG. 1 shows the Statite in the plane of the drawing. In general, this will not be the case. The Statite can be positioned nearly anywhere over the dark side of the Earth and does not have to be exactly opposite of the Pole from the Sun. The sail 1, of Statite 9 is then oriented tangent to the radial direction of the Earth. The light form the Sun 11 strikes the reflector sail at angle phi. Simple geometric considerations will show that phi equals beta plus theta.

The sunlight reflecting off the sail produces a light pressure force Fp. If the sail is highly reflecting (which is relatively easy to achieve in practice), then the direction of the light pressue is normal to the back of the sail. Since the sail is tangent to the radial direction, and the light pressure on a flat solar sail is normal to the back of the sail, the light pressure force will be directed radially away from the Earth. Since the Statite is stationary with respect to the Earth, the gravitational attraction of the mass of the Earth for the mass of the Statite is not cancelled out by orbital motion, instead it is cancelled by the light pressure force.

To give some estimate of what could be accomplished in a first generation version of a Statite, the solar sail may be the technology studied by the Jet Proportional Laboratory in 1976 (Louis D. Friedman, et al., "Solar Sailing Development Program", FY 1977), (720-9, Final Report, vol. 1, Jan. 30, 1978, Jet Propulsion Laboratory, Pasadena, Calif. 91109).

Figure 2:
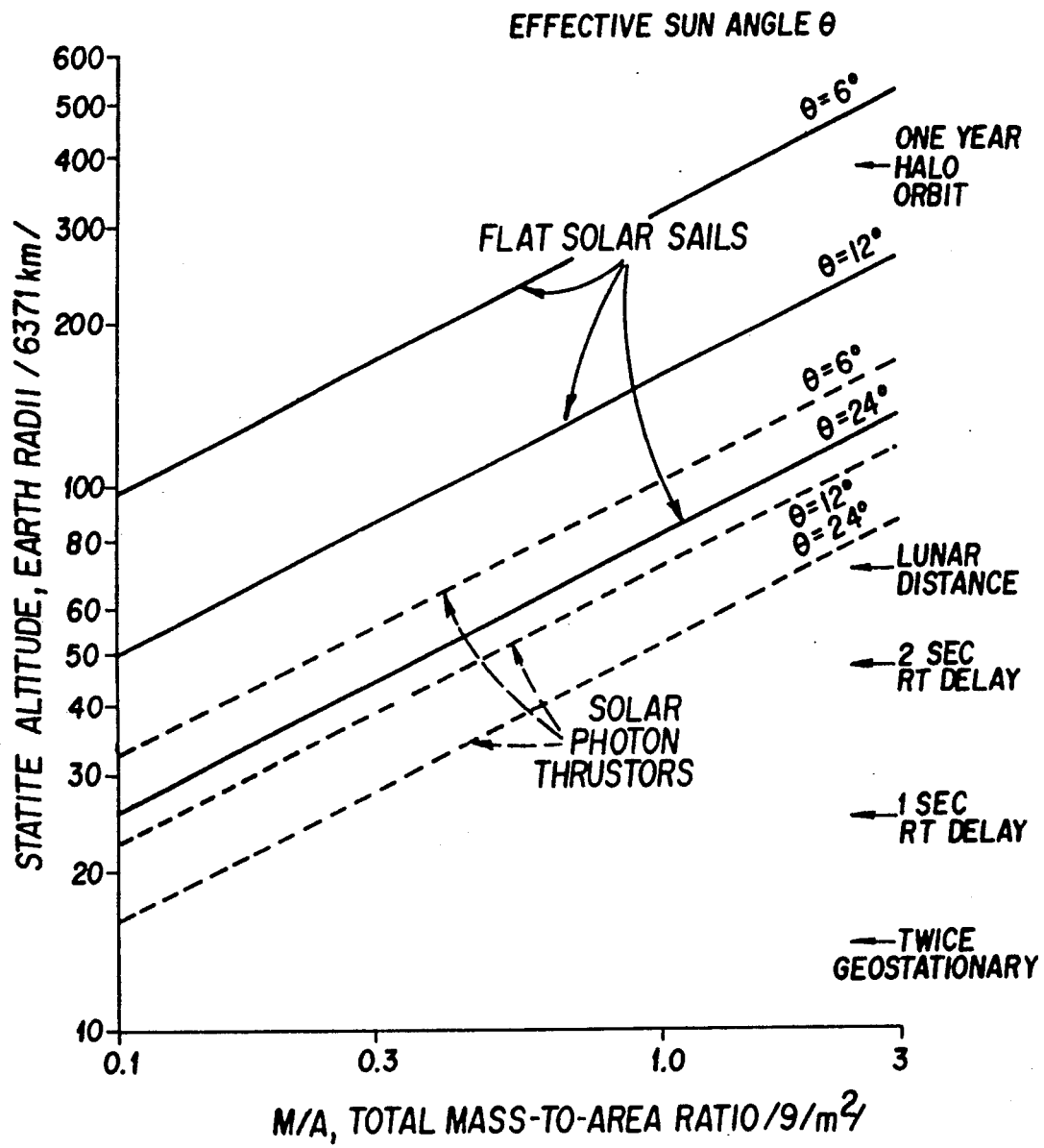
FIG. 2 is a diagram relating Statite altitude to several solar sail mass to area ratios.

Using this technology, the minimum distance from the earth for a Statite is sixty Earth radii or about nine times the geostationary orbit distance. Second and third generation sail and reflector technology could allow Statites to operate at lower altitudes and at angles closer to the Earth's poles. FIG. 2 is a plot of Statite altitude given in Earth radii for several solar sail designs given in grams per square meter of sail area.

Figure 3:
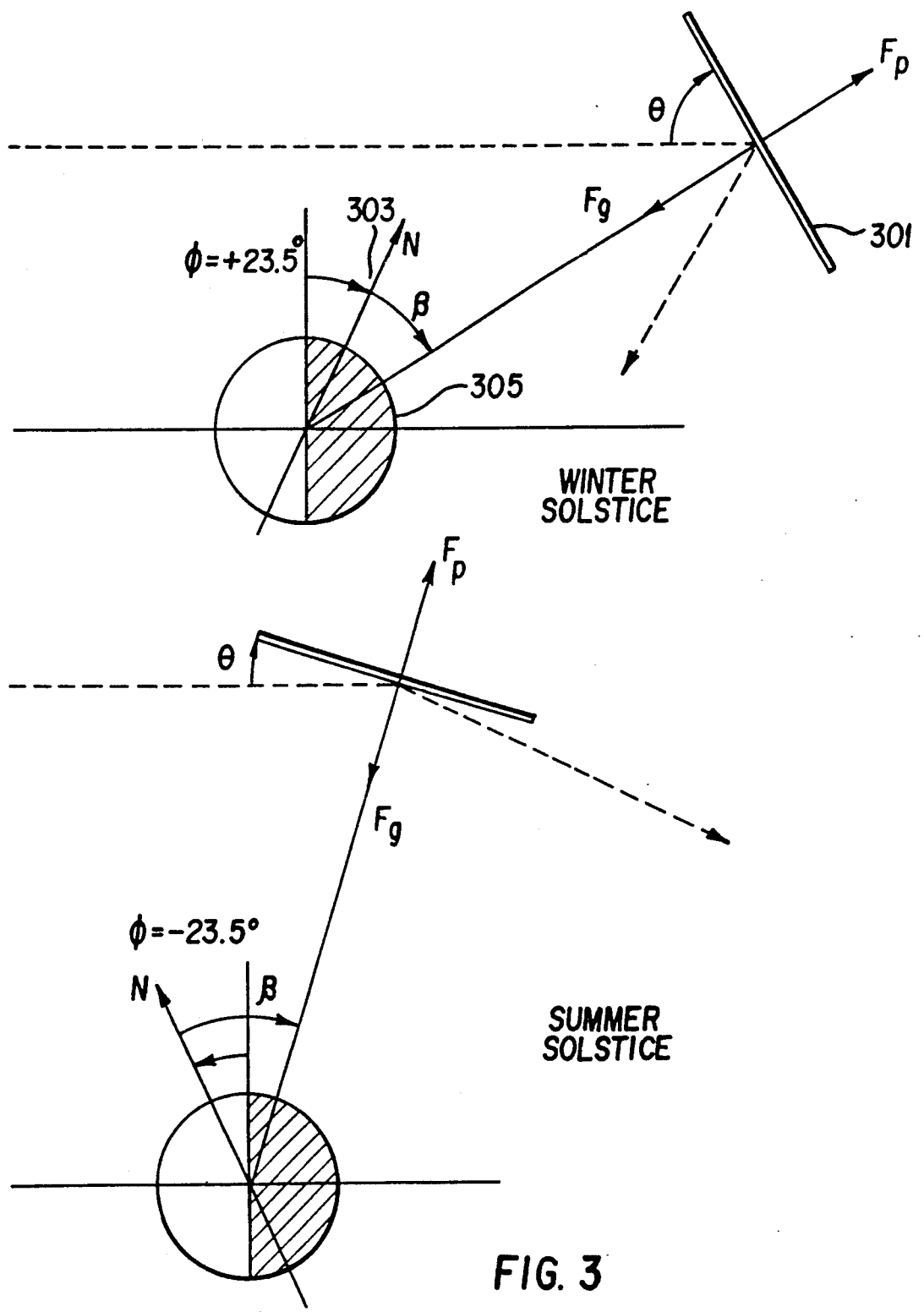
FIG. 3 is a diagram showing the operation of a Statite at a fixed Polar angle.

Depending on operational requirements, a Statite system can be operated in a number of modes. Its normal operation, as shown in FIG. 3, Statite 301 will always be kept at a fixed angle beta from the polar axis 303 of the Earth 305. This angle will have to be greater than 23.5% because the tilt of the polar axis of the Earth takes each pole 23.5% to the sunward side of the earth during one of the solstices and the Statite has to stay over the dark side of the Earth. In practice the angle could range from 30% to 45%. Statites at these angles could provide communication services to the United States, Europe, Alaska, Canada, all of the USSR, northern China, Argentina, Chile, New Zealand, southern Australia, and, of course, the Arctic and Antarctic.

FIG. 3 shows the position of the Statite at the summer and winter solstices. At the summer solstice, and at an angle from the polar axis where beta equals thirty degrees (30%), the angle at the incoming sunlight will strike the sail at 6.5 degrees. At this angle to the sunlight, the performance of a flat solar sail is severely degraded. In such a situation, the Solar Photon Thruster has a considerable advantage over the simple· solar sail in Statite operation.

ALTERNATIVE MODES OF STATITE OPERATION

For typical operation of the Statite, where solar light pressure is used to cancel the gravitational pull of the Earth, the net light pressure force must be in the direction away from the Earth. This requires that the Statite be on the dark side of the Earth. Another mode of operation would be to keep the Statite as close to the polar axis as possible throughout the year. This would provide better service to the polar regions at the cost of requiring one annual elevation "nodding" of the ground antenna.

A very different mode of Statite system operation is possible that would allow the Statite to be placed at any point around the Earth, at all times of the year, even over the sunlit side, at the expense of slightly greater operating distance. Instead of the Statite being balanced by sunlight in the gravitational field of the Earth, the Statite would be placed in orbit around the Sun, at such a distance from the earth that the gravitational field of the Earth plus the moon is only a perturbation on the gravitational field of the Sun.

Figure 4:
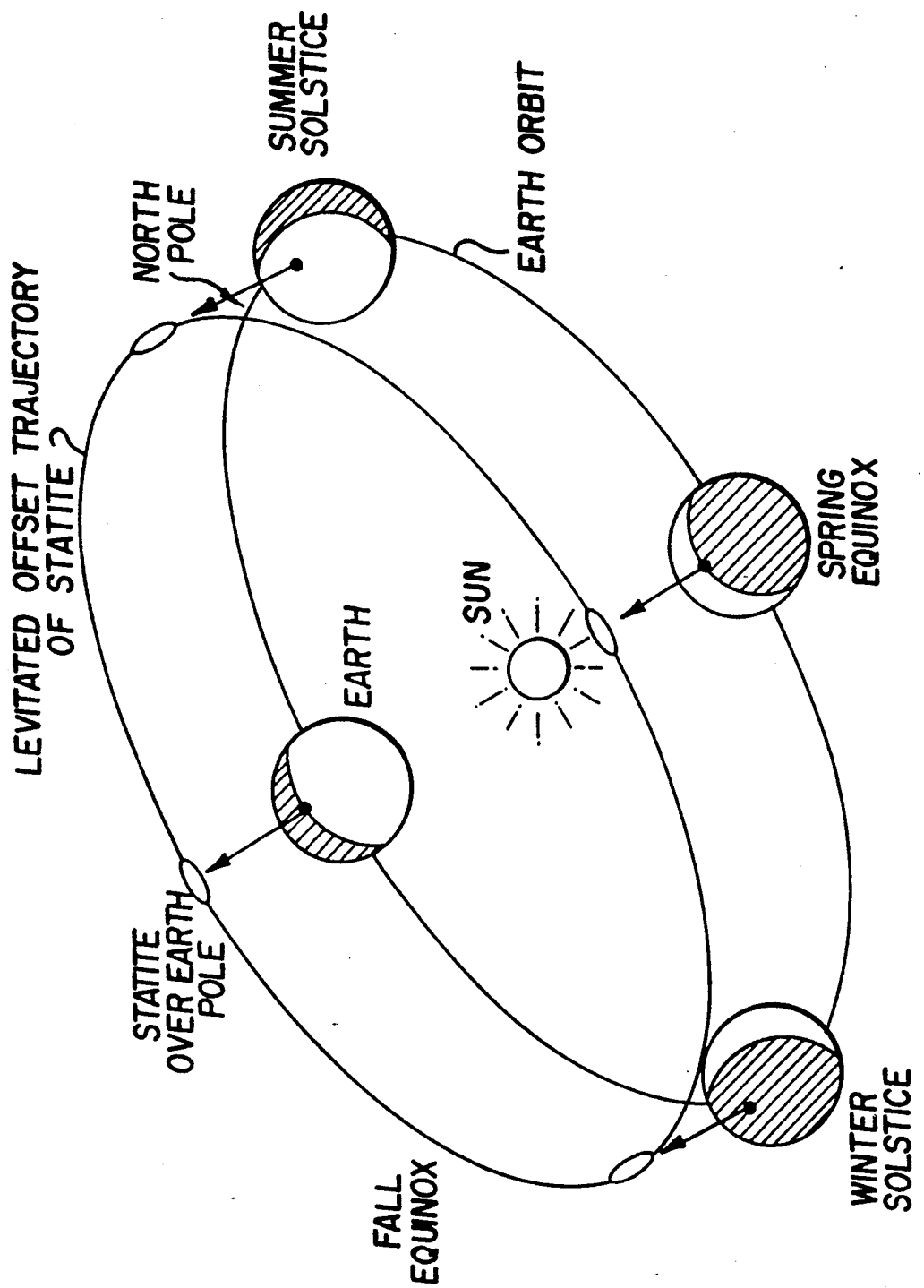
FIG. 4 shows an alternative embodiment of the Statite system, wherein the Statite is in solar orbit.
Figure 5:
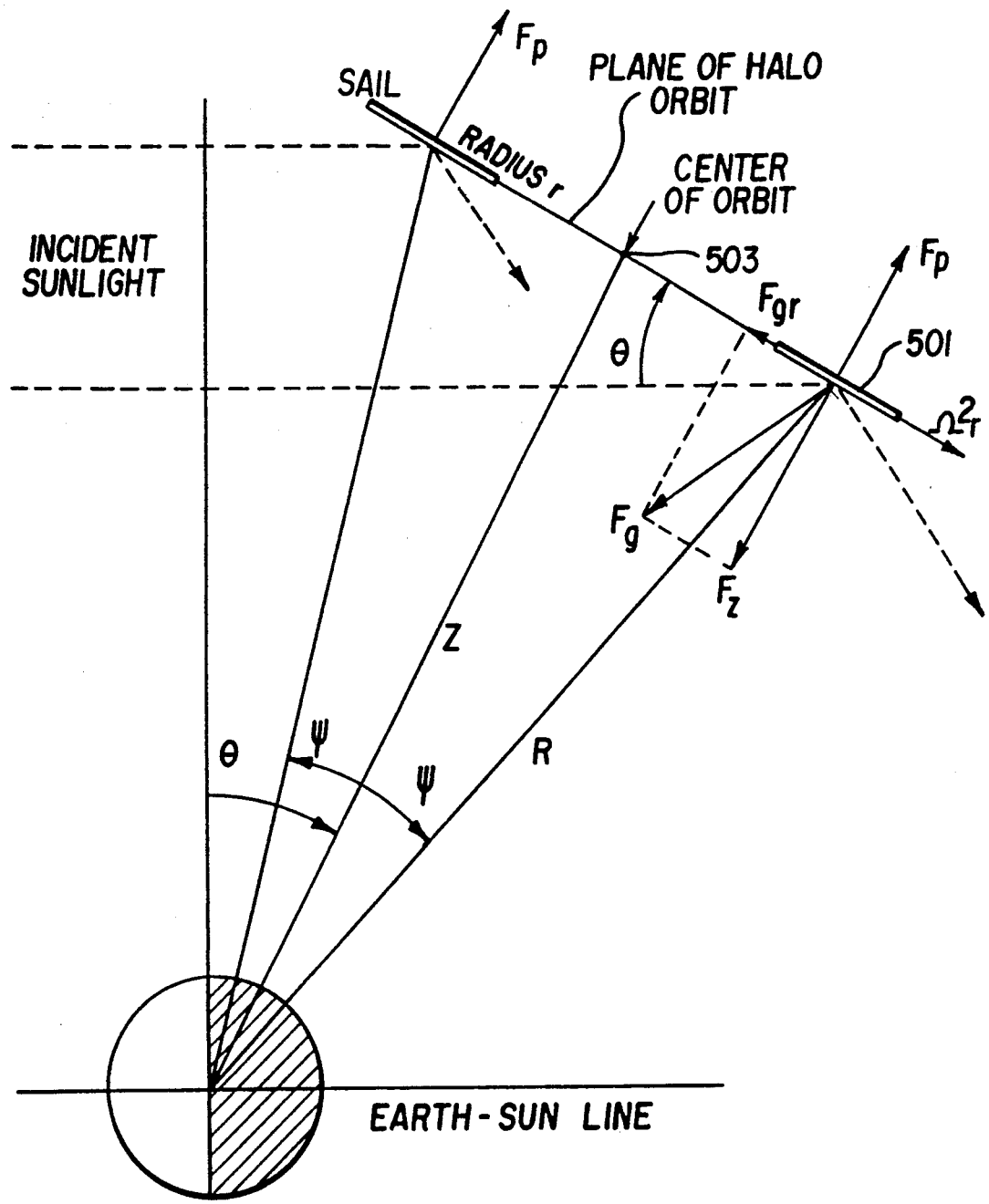
FIG. 5 is a force diagram for a Statite in a halo orbit.

In this embodiment of the present invention, the solar propulsion system would be controlled so the Statite moves in a slightly ecliptical orbit around the Sun with a period equal to the Earth orbital period of one year. Light pressure is used to "levitate" the plane of this Statite's solar orbit above or below the ecliptic plane, and to vary the radius of the orbit during the year so that the Statite moves inside and outside the orbit of the Earth. The result would be that, to an observer on the Earth, the Statite remains fixed above one of the Poles of the Earth. Thus, although the spacecraft would be a "satellite" of the sun, it is a Statite of the Earth because it is adjacent to the Earth, but not in orbit around it. This embodiment is shown in FIG. 4 showing the Statite above the North Pole at the equinoxs and the solstices. The 1976 JPL solar sail technology has ample propulsive capability to allow it to carry out the orbit levitation and orbit ellipticity maneuvers necessary to place a Statite over the Poles of the Earth at all times of the year using the solar orbit embodiment of the present invention. Another mode of Statite system operation would place the Statite in an orbit around a fixed point adjacent to the Earth. In this mode of operation, although the Statite is moving relative to the Earth, it is not in orbit around the Earth, and, therefore, is not a satellite of the Earth. As is shown in FIG. 5, if Statite 501 keeps its orientation inertially fixed while it is displaced off of its normal fixed operating point 503, the light pressure force Fp will compensate for the component of the gravitational force Fgz normal to the sail, but there will be a component of the gravitational force Frg tangent to the sail that will attempt to pull the Statite back to its normal fixed operating point; just as if there were a mass located at that point. The Statite can thus be induced to move through or circle about that point in a "halo orbit".

Finally, there is an interesting distance of three hundred and forty Earth radii where the period of such a "halo" orbit for a Statite is one year. The Earth's gravity at this distance is so weak that it could easily be reached by a 1976 JPL technology sail carrying a five ton payload. The center of this halo orbit would be chosen at some distance over the dark side of the Earth that would yield a comfortable sail tilt angle. Such a Statite would circle above the arctic circle, just 23.5 degrees from the polar axis, keeping itself positioned over that point where the northern most portion of the terminator crosses the arctic circle. To an observer on the ground, the Statite would appear to spin around the Pole once a day, staying on the opposite side of the Earth from the Sun. Such a Statite could be continuously observed anywhere north of twenty-four degrees north latitude.

Although the present invention has been to describe specifically with regard to certain preferred embodiments in the specification above, the invention is more general than it is shown in this specification, and should be limited only by the appended claims and their equivalents.

I claim:

1. A method of using a statite wherein said statite comprises an artificial spacecraft maintained adjacent to the earth by solar light pressure force, and said statite is not in the geostationary orbital arc around the earth, yet remains geosynchronous with respect to the earth, thereby allowing said statite to operate at higher latitudes with respect to the earth, said method comprising the steps of:

launching the Statite from the Earth, without imparting to the Statite a significant centrifugal acceleration, to an altitude where the light pressure on the Statite's solar sail is equal to the force of the Earth's gravity whereby there is no significant effects from centrifugal acceleration with respect to the earth; and positioning the Statite over the night side of the Earth so the force of the Earth's gravity on the Statite is substantially cancelled by the force resulting from the light pressure acting on the statite.

2. A method as in claim 1, wherein the Statite is positioned substantially over one of the Earth's rotation poles such that it remains relatively geostationary without being in orbit around the Earth.

3. A method as in claim 1, wherein the Statite launched from the Earth into solar orbit is flown in formation with the Earth at a substantially constant distance from the Earth's center.

4. A method as in claim 1, wherein the Statite's angular velocity around the Sun is essentially the same as the Earth's angular velocity around the Sun.

* * * * *